United States Patent
Li

[11] 3,853,832
[45] Dec. 10, 1974

[54] SYNTHETIC HUMAN PITUITARY GROWTH HORMONE AND METHOD OF PRODUCING IT

[75] Inventor: Choh H. Li, Berkeley, Calif.

[73] Assignee: Harmone Research Foundation, Berkeley, Calif.

[22] Filed: Apr. 27, 1971

[21] Appl. No.: 137,811

[52] U.S. Cl. .............................. 260/112.5, 424/177
[51] Int. Cl. ............................................ C07c 103/52
[58] Field of Search ................................ 260/112.5

[56] References Cited
OTHER PUBLICATIONS

M. Theoleyre, Annales d'Endocrinologie, 31, 100, (1970).
C. H. Li et al., Biochim. Biophys. Acta, 160, 472, (1968).

*Primary Examiner*—Elbert L. Roberts
*Attorney, Agent, or Firm*—Pennie & Edmonds

[57] ABSTRACT

Synthetic human pituitary growth hormone (HGH) is produced by attaching phenylalanine, the COOH terminal amino acid of HGH, to a solid resin support, and then coupling stepwise to the supported acid the remaining 187 amino acid residues of the HGH molecule, using the general technique of solid phase peptide synthesis with suitable protective and blocking groups, and deblocking and coupling agents. The resulting synthetic polypeptide chain of 188 amino acid residues is liberated from the resin support and all protecting groups are removed. Then the synthetic hormone is oxidized under controlled conditions effective to form two disulfide bridges across the cysteine residues in the chain, thereby forming the two intra-molecular rings which are required to reproduce the correct conformation of the HGH molecule. The resulting synthetic hormone reacts immunologically with rabbit antiserum to HGH and possesses growth-promoting and lactogenic activity.

20 Claims, 1 Drawing Figure

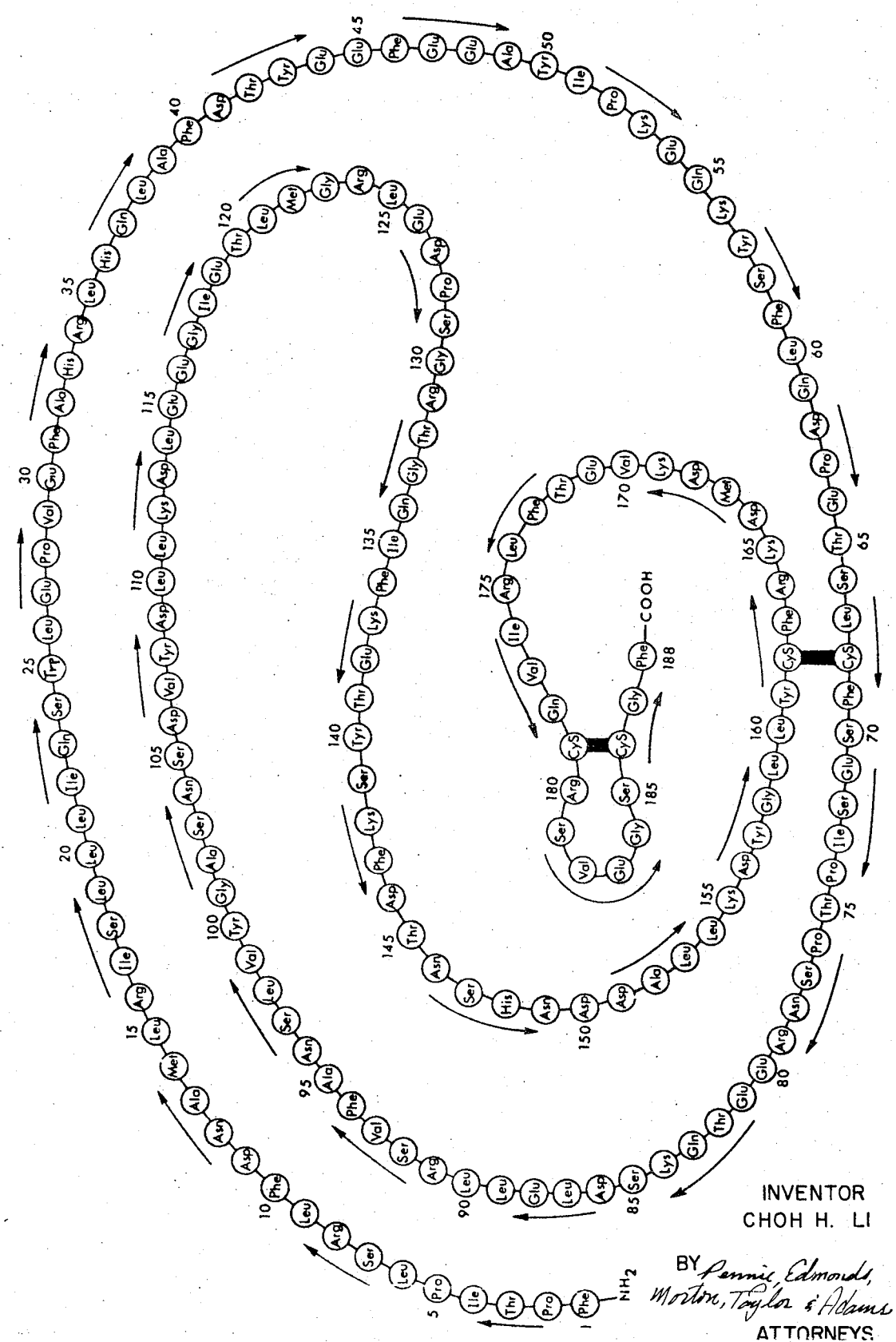

SYNTHETIC HUMAN PITUITARY GROWTH HORMONE AND METHOD OF PRODUCING IT

BACKGROUND OF THE INVENTION

1. Field of the Invention

This invention pertains to the field of human pituitary growth hormone (HGH). More particularly, the invention relates to the production of said hormone and certain of its derivatives by an entirely synthetic method, which achieves both the correct molecular conformation of HGH and the biological activities that have been exhibited by the natural hormone obtained from human pituitaries.

2. Description of the Prior Art

The isolation and structure of natural human pituitary growth hormone (HGH) have been published in the prior art (e.g., C.H. Li and H. Papkoff, Science, 124, 1293 (1956); C.H. Li, W.K. Liu and J.S. Dixon, Journal of the American Chemical Society, 88, 2050 (1966) ). The HGH molecule is depicted in the accompanying drawing. It consists of a polypeptide chain of 188 amino acid residues in the sequence shown, with phenylalanine residues at its terminal COOH and $NH_2$ ends. There are two disulfide bridges linking the cysteine residues across positions 68 and 162 and across positions 179 and 186, thus forming two intra-molecular rings containing respectively 94 and six amino acid residues. The complexity of this molecule is self-evident.

Following the disclosure in the prior art of the growth-promoting and lactogenic potency of natural human HGH, there has been widespread interest in evaluating its clinical uses for alleviating human disorders such as dwarfism. However, such investigations have been frustrated by the lack of an adequate supply of the natural hormone. On the average only about 70 mg of natural HGH can be extracted from fifty fresh human pituitaries, and the availability of the requisite pituitaries from cadavers is quite limited. Thus, there has been a definite need in the prior art for a more ample source of HGH hormone which, to this applicant's knowledge, has not been satisfied heretofore. The present invention offers a solution to some of the foregoing problems by providing a synthetic method of producing HGH with the biological activities of the natural hormone, but without the difficulties of having to obtain it from the natural source.

SUMMARY OF THE INVENTION

The invention is based upon the discovery that the correct molecular conformation of HGH hormone can be achieved in a totally synthetic product, with concomitant biological activities, by a sequence of steps which may be summarized as: (1) formation of the requisite polypeptide chain of 188 amino acid residues attached to a resin support using the general technique of solid phase peptide synthesis, (2) liberation of the polypeptide chain from the support and removal of all protective or blocking groups, thus generating sulfhydryl groups at the cysteine residues, (3) oxidation of the sulfhydryl groups under controlled conditions to form disulfide bridges across the cysteine residues and thus produce the two intra-molecular rings in the final HGH molecule as depicted in the accompanying drawing.

While each of the foregoing general steps is essential in the sense that without it the synthetic hormone of the invention cannot be obtained, of critical importance is the oxidation step by which the disulfide bridges across the cysteine residues are formed. As indicated in the drawing, the conformation of the HGH molecule includes two intra-molecular rings containing respectively 94 and six amino acid residues. It has been discovered that his conformation can only be obtained by performing the oxidation step under carefully regulated conditions, after the polypeptide chain has been separated from the solid support. While anchored to the support, experience has shown that the polypeptide chain is under too great a constraint physically to undergo the bending and looping required to achieve the requisite ringed conformation, by oxidative linking of the cysteine sulfhydryl groups. On the other hand, once the polypeptide chain has been liberated from the impediment of the solid support, its oxidation must be carefully regulated in order to establish conditions under which the aforesaid bending and looping can occur to achieve the requisite conformation in a synthetic, homogeneous, biologically active product.

Accordingly, because of its great importance to the successful practice of the invention, the conditions required during the oxidation step will now be described. First, it is necessary that the rate of oxidation be controlled by the presence of a separate reducing agent (i.e., oxidizable material) in admixture with the polypeptide. This reducing agent apparently retards or otherwise regulates the oxidation rate, and thus prevents degradation of the complex, delicate polypeptide and gives it an opportunity to assume the requisite conformation during the formation of the disulfide bridges. The reducing agent may be any organic mercapto compound signified by the formula, R-SH (where R is an organic hydrocarbon radical of 1 to 30 carbon atoms), which is inert to the HGH polypeptide. For best results, dithiothreitol is the preferred reducing agent and examples of other agents which can be used are mercaptoethanol and cysteine. The proportion of admixed reducing agent may vary from 10 mg to 200 mg per 100 mg of HGH polypeptide; however, the preferred proportion is 50 mg/100 mg polypeptide.

The oxidation step is performed with the HGH polypeptide in solution or suspension and the concentration of the polypeptide therein also must be controlled. This again appears to be an influencing factor on the rate and progress of oxidation in context of achieving the requisite ringed conformation, as concentrations beyond the operable range are not effective. Generally, the HGH polypeptide concentration may be from about 0.01 mg to about 0.5 mg of polypeptide per ml of solution; however, for best results the preferred concentration is 0.25 mg per ml of solution. The pH of the solution during oxidation is another factor which must be controlled in order to achieve the biologically active, synthetic product of the invention. The pH generally should be maintained within the range from about 4.5 to about 9.0; however, for best results the preferred pH is from 8.0 to 8.4.

Finally, the temperature to which the HGH polypeptide solution is exposed during oxidation must be controlled. As previously mentioned, the synthetic polypeptide is a complex and delicate molecule which is susceptible to degradation or damage if the temperature exceeds certain limits during oxidation. Therefore, the ambient temperature surrounding the solution should be maintained in the range from about 0° to about 25° C. during oxidation.

The oxidation reaction carried out under the above-described conditions is an auto-oxidation, that is, it will proceed on exposure of the HGH polypeptide solution to air, and this is the preferred method. However, air, oxygen or oxygen-inert gas mixtures can also be bubbled through the solution as an alternative. The oxidation is continued until the sulfhydryl groups on the cysteine residues have been oxidized to disulfide linkages. Generally, this will require at the minimum from 4 to 6 hours, or longer. There is no maximum limit to the duration of the oxidation time period beyond consumption of the sulfyhydryl groups. Under the established controlled conditions, there is little likelihood of degradation or damage to the synthetic HGH product if the oxidation is continued beyond that limit.

After completion of the oxidation step, the resulting synthetic HGH hormone is treated with acetic acid for purposes of isolation and purification. The use of acetic acid for this purpose is important to prevent aggregation of the hormone and to retain its biological potency. The strength of the acetic acid may vary from a 10 to 75 percent aqueous solution; however, for best results the use of 50 percent aqueous acetic acid solution is preferred. The general technique which is preferred for separation and purification of the synthetic hormone is column or gel chromatography on polycarboxylic resins or dextran gels.

In addition to the synthetic HGH hormone depicted in the drawing, included within the scope of this invention are certain biologically active derivatives thereof. These derivatives comprise the HGH hormone substituted at the tryptophan residue (position 25) with either a 2-hydroxy-5-nitrobenzyl group or a 2-nitrophenylsulfenyl group, both of which derivatives have growth promoting activity. Another derivative comprises the HGH hormone reduced at its cysteine residues (positions 68,162,179 and 186) to sulfhydryl and alkylated with iodoacetamide to form a tetra-S-carbamidomethyl derivative which has growth-promoting and lactogenic activities.

As previously indicated, the initial phase of the method of this invention involves anchoring phenylalanine to a solid resin support and then coupling stepwise to the supported acid the remaining 187 amino acid residues of the HGH molecule, using the general technique of solid phase peptide synthesis. This technique is comprehensively described, for example, by J.M. Stewart and J.D. Young in "Solid Phase Peptide Synthesis" (W.H. Freeman and Company, San Francisco, 1969). The basic sequence involves reacting a protected amino acid, i.e., t-butyloxycarbonyl phenylalanine, with a synthetic resin such as chloromethylated styrene-divinylbenzene copolymer to form an ester bond between the carboxyl groups of the protected acid and the reactive halogenated sites of the resin. The protective group is then selectively removed to generate the free amino group of the resin-supported phenylalanine residue, thus making this group available for reaction with the carboxyl group of the next protected amino acid (i.e., glycine in the case of HGH hormone). This next reaction links the protected amino acid and the resin-supported acid residue by an amide bond, and subsequent removal of the protective group from the second acid residue to generate a free amino group again prepares the supported peptide chain for reaction with the next protected amino acid, etc. After the entire polypeptide chain has been developed by stepwise coupling of each amino acid residue as described above, the chain is separated from the resin support and the protective groups on the polypeptide side chains are removed by reaction with cleaving and de-blocking agents, e.g., hydrogen fluoride and sodium in liquid ammonia, thus generating the free polypeptide.

The various protective, coupling, deblocking and cleaving agents which are useful in the technique of solid phase synthesis with the species of amino acids that are included in the HGH molecule are described in the art. Generally speaking, these agents also may be used in forming the HGH chain of 188 amino acid residues shown in the drawing, and the various specific alternatives which may be practiced will be evident to those skilled in the art from the subsequent description of the preferred embodiments of the method of the invention.

BRIEF DESCRIPTION OF THE DRAWING

As previously stated, the accompanying drawing illustrates the molecular conformation and structure of human pituitary growth hormone, which consists of 188 amino acid residues in the depicted sequence and double-intra-molecular ring configuration. The numbers and arrows outside the acid residue units are merely aids for locating or studying portions of the total structure. The abbreviations for the various amino acid residues are standard and for convenience are translated as follows:

| Abbreviation | Amino Acid |
|---|---|
| Ala | Alanine |
| Arg | Arginine |
| Asn | Asparagine |
| Asp | Aspartic acid |
| Cys | Cysteine (half) |
| Glu | Glutamic acid |
| Gln | Glutamine |
| Gly | Glycine |
| His | Histidine |
| Ile | Isoleucine |
| Leu | Leucine |
| Lys | Lysine |
| Met | Methionine |
| Phe | Phenylalanine |
| Pro | Proline |
| Ser | Serine |
| Thr | Threonine |
| Trp | Tryptophan |
| Tyr | Tyrosine |
| Val | Valine |

DESCRIPTION OF THE PREFERRED EMBODIMENTS

For purposes of illustration and to indicate the best modes presently contemplated of practicing the invention, the following specific embodiments are now described.

EXAMPLE 1

Synthesis of the 188 amino acid polypeptide chain of HGH was initiated by esterification of 0.52 mmol of tert-butyloxycarbonyl-protected phenylalanine to 2.5 g of chloromethylated 1 percent cross-linked polystyrene-divinylbenzene resin (available commercially from Bio-Rad Laboratories, Richmond, Cal.).

The tert-butyloxycarbonyl protective group (i.e., Boc) was subsequently removed by reaction of the protected phenylalanine-resin ester for 15 minutes with 50 percent (v/v) trifluoroacetic acid in methylene chloride. Thereafter, Boc-protected glycine was coupled to the resin-supported phenylalanine residue using dicyclohexylcarbodiimide as the coupling agent, the reaction being carried out over 5 hours with 4 equivalent of the protected glycine and of the coupling agent per equivalent of the phenylalanine residue attached to the resin support.

After removal of the Boc protective group from the glycine residue with the same trifluoroacetic acid deblocking agent, the resulting free amino group was ready for coupling to the next protected amino acid, cysteine.

The stepwise coupling of the successive amino acid residues in the sequence of the HGH molecule was continued using the technique disclosed above. The Boc group was used for protection of the α-amino group of all amino acids. Certain of the amino acids were used in the form of derivatives, and the Boc protective group was used to protect the α-amino group of these derivatives as well. Such derivatives were the β-benzyl ester of aspartic acid, the β-benzyl ether of threonine, the β-benzyl ether of serine, the γ-benzyl ester of glutamic acid, the β-benzyl thio ether of cysteine, the benzyl ether of tyrosine, ε-carbobenzoxy substituted lysine and ε-nitro substituted arginine. For introduction of the histidine residue $N^\alpha$-Boc (im-Boc)-L-histidine was used.

The coupling reactions were carried out with dicyclohexylcarbodiimide in the manner described above, except that the asparagine and glutamine acids were coupled by means of their nitrophenyl esters. Also, for the coupling of the valine, isoleucine and nitroarginine residues, six equivalents of the protected acid and of the coupling agent were used per equivalent of phenylalanine residue originally attached to the supporting resin.

The nitrophenyl esters of asparagine and glutamine were coupled by reaction of ten equivalents of the ester per equivalent of phenylalanine residue for 5 hours, followed by an additional five-hour reaction in the presence of five equivalents of imidazole.

After the tryptophan residue was incorporated in position 25, 0.08 mole of dithiothreitol was added to the trifluoroacetic acid deblocking agent and this combination was used in all subsequent removals of the Boc protective group in order to deblock and preserve the tryptophan residue.

The foregoing procedures yielded a protected, unbridged 188 acid residue, synthetic polypeptide in the sequence shown in the drawing, with the COOH terminal phenylalanine residue attached to the supporting resin. In order to remove all protecting groups from the synthetic polypeptide and to liberate it from the supporting resin, it was reacted with hydrogen fluoride and then with sodium in liquid ammonia. The liberated synthetic polypeptide was next treated with liquid hydrogen fluoride in the presence of anisole for 15 minutes at 0° C. and approximately 15 minutes at 0–20° C. The polypeptide next was purified in 50 percent acetic acid and then it was treated in four batches with sodium in liquid ammonia. The total amount of polypeptide was 330 mg, and each batch (ca. 80 mg) was stirred near the boiling point for 2 hours in 350 ml of liquid ammonia freshly distilled from sodium, and then treated at the boiling point with sodium until a light blue color was maintained for about 1 hour.

Next the deblocked, purified synthetic polypeptide was auto-oxidized in air under controlled conditions as previously described. The concentration of the polypeptide was about 0.25 mg/ml of solution. Included in the solution was about 0.5 mg of dithiothreitol per mg of the polypeptide. The pH was maintained at 8.4, and oxidation was carried out for 4–5 hours at 25° C. This step resulted in the formation of disulfide linkages between the cysteine residues across positions 68 and 162 and across positions 179 and 186, to form the two intramolecular rings illustrated in the drawing.

The oxidized polypeptide was isolated by lyophilization and was desalted on dextran gel (available commercially as Sephadex G-25 from Pharmacia Labs Inc., Piscataway, N. J.) in 50 percent acetic acid. It was then subjected to repeated gel filtration on dextran gel (Sephadex G-100) in 20 percent acetic acid until a fraction was isolated which travelled in the column as a single peak at a maximum comparable to the curve of natural HGH hormone.

Spectrophotometric measurements on the synthetic protein indicated a tyrosine:tryptophan ratio of 7.5 as compared to the known value of 8. Amino acid analysis of an acid hydrolysate gave: $Lys_{12.8}His_{1.8}Arg_{9.7}Asp_{25.5}Thr_{9.2}Ser_{17.8}Glu_{22.0}Pro_{5.9}Gly_{9.9}Ala_{7.8}Cys_{4.3}Val_{9.2}Met_{1.5}Ile_{7.2}Leu_{30.1}Tyr_{3.6}Phe_{12.4}$. These values were comparable with the analysis of natural HGH treated with HF and Na-NH$_3$: $Lys_{9.9}His_{2.5}Arg_{10.0}Asp_{23.3}Thr_{9.9}Ser_{17.1}Glu_{28.7}Pro_{8.1}Gly_{9.3}Ala_{7.1}Cys_{3.1}Val_{7.6}Met_{1.2}Ile_{6.7}Leu_{24.7}Tyr_{6.4}Phe_{11.9}$.

The synthetic product was found to react immunologically with the rabbit antiserum to HGH as revealed by the agar diffusion test. When the synthetic product was assayed by the rat tibia and pigeon crop-sac tests, it gave approximately 10 percent growth-promoting potency and 5 percent lactogenic activity in comparison with that of natural HGH hormone.

EXAMPLE 2

The synthetic polypeptide obtained as described in Example 1 may be reacted with 2-hydroxy-5-nitrobenzyl bromide to form a biologically active derivative at the tryptophan residue in the molecule. In order to form the derivative, 10 mg of 2-hydroxy-5-nitrobenzyl bromide is added to 1.0 ml of a 2 percent solution of the synthetic polypeptide in 0.1M acetic acid. The mixture is stirred at room temperature for 1 hour, and then diluted and thoroughly dialyzed against distilled water for 2 days. After lyophilization, the product is dissolved in 0.01M ammonium hydroxide and chromatographed on a column of dextran using 0.1M ammonium hydroxide as eluent to remove any unreactive reagent. The unretarded fraction is recovered by lyophilization.

EXAMPLE 3

The synthetic polypeptide obtained as described in Example 1 may be reduced and alkylated with iodoacetamide to form another biologically active derivative. In order to form this derivative, the disulfide bridges in the polypeptide are first reduced with mercaptoethanol in 8M urea. The polypeptide is dissolved in the 8M urea solution in a concentration of 20 mg of polypeptide per ml of solution, and the pH of the solution is adjusted to 8.5 with 5 percent methylamine solution. Air is removed by flushing with nitrogen and, after addition of 0.001 ml of mercaptoethanol per mg of polypeptide, reaction is allowed to proceed in a stoppered flask for 6 hours at 23° C. Water is added to dilute the urea concentration to 2M and then a tenfold excess (with respect to mercaptoethanol) of iodoacetamide is added with adjustment of the pH to 8.5 by addition of 5 percent methylamine solution. The solution is allowed to stand for 15 minutes and at the end of this period the unreacted iodoacetamide in the mixture is removed by reaction with an excess of mercaptoethanol. The reaction product is purified by exclusion chromatography on dextran using 0.01M ammonium hydroxide solution as the eluent. The resulting final product comprises a tetra-S-carbamidomethyl derivative of the synthetic polypeptide which has the biological activity of the parent synthetic hormone.

EXAMPLE 4

The synthetic polypeptide obtained as described in Example 1 may be reacted with 2-nitrophenylsulfenyl chloride to form another biologically active derivative at the tryptophan residue in the molecule. In order to form this derivative, 1 μmole of the synthetic polypeptide is dissolved in 2 ml of 25 percent acetic acid and 20 μmoles of 2-nitrophenylsulfenyl chloride (dissolved in 1 ml of glacial acetic acid) are added with stirring. After 1 hour the reaction product is separated from the unreacted excess of 2-nitrophenylsulfenyl chloride by gel filtration on a 2.2 × 20 cm column of dextran gel (Sephadex G-25), which has been preequilibrated and eluted with 0.2M acetic acid. After lyophilization (or concentration by ultrafiltration), final purification of the reaction product is carried out by gel filtration using a 3 × 60 cm column of dextran gel (Sephadex 100), which also has been preequilibrated and eluted with 0.2M acetic acid solution. The final, purified derivative is recovered by lyophilization or ultrafiltration.

The biological potency and activity of the synthetic polypeptide produced in accordance with the invention was determined by standard tests utilized in the art for evaluating such properties. Thus the immunological reaction with rabbit antiserum to HGH was determined by the agar diffusion test described by O. Ouchterlony, "Acta Pathol. Microbiol. Scand.", 26, 507 (1949); 32, 231 (1953). The growth-promoting activity of the synthetic polypeptide was evaluated by the rat tibia test described by I. I. Geschwind and C. H. Li in "The Hypophyseal Growth Hormone, Nature and Actions," R. W. Smith, Jr., O. H. Gaebler, and C. N. H. Long, Ed., Blakiston, N.Y., N.Y., 1955, p. 28. The lactogenic activity of the synthetic polypeptide was assayed by the pigeon crop-sac test described by W. R. Lyons, "Proc. Soc. Exptl. Biol.," 35, 645 (1937); C. S. Nicoll, "Endocrinology", 80, 641 (1967).

The growth-promoting and lactogenic activities of synthetic HGH hormone produced in accordance with Example 1 were compared to the activities of natural HGH hormone and of natural HGH hormone reduced and oxidized by the same treatments with sodium in liquid ammonia and air in the presence of dithiothreitol as used in said example to produce the synthetic material. The results of these comparisons are given in the following table:

| Preparation | Rat Tibia Test | | Pigeon Local Crop Test | |
|---|---|---|---|---|
| | Total Dose μg | Tibia Width* μ | Total Dose μg | Dry Mucosal Weight* mg |
| Natural HGH | 20 | 211 ± 4(12) | 2 | 13.5 ± 3(6) |
| | 60 | 269 ± 5(11) | 8 | 18.2 ± 5(5) |
| Natural HGH-Reduced and Oxidized | 50 | 212 ± 26(4) | 5 | 12.2 ± 3(4) |
| | 200 | 270 ± 17(4) | 40 | 20.2 ± 4(4) |
| Synthetic HGH | 50 | 184 ± 10(4) | 50 | 12.5 ± 3(4) |
| | 200 | 223 ± 17(3) | 200 | 20.5 ± 3(3) |
| Saline | 0 | 168 ± 2(12) | 0 | 8.0 ± 2(6) |

*Mean ± standard error (no. of rats of pigeon crop sacs).

From the foregoing data, it is evident that the invention provides a snythetic HGH hormone which has the conformation of the natural hormone, and also the biological activities of the natural hormone. The synthetic product is useful for promotion of growth and lactation in animals and its clinical effectiveness for the same purposes in humans is clearly indicated by these data.

It should be understood that although particular embodiments of this invention have been described in detail by way of illustration, the invention includes all modifications and equivalents thereof within the scope of the appended claims.

I claim:
1. A method of producing a synthetic human growth - promoting substance which comprises:
   a. forming an unbridged polypeptide chain of 188 amino acid residues in the sequence shown in the accompanying drawing;
   b. generating sulfhydryl groups on the cysteine residues in said polypeptide chain;
   c. oxidizing said sulfhydryl groups under conditions effective to form disulfide bridges between said cysteine residues, thereby forming two intramolecular rings in the polypeptide chain.

2. A method of producing a synthetic human growth - promoting substance which comprises:
   a. forming an unbridged polypeptide chain of 188 amino acid residues in the sequence shown in the accompanying drawing;
   b. generating sulfhydryl groups on the cysteine residues at positions 68, 162, 179 and 186 in said polypeptide chain;
   c. oxidizing said sulfhydryl groups under conditions effective to form disulfide bridges between said cysteine residues across positions 68 and 162 and across positions 179 and 186; thereby forming two intra-molecular rings in the polypeptide chain as shown in the drawing.

3. A method according to claim 2 wherein said oxidation is carried out in solution in the presence of an organic mercapto compound of formula R-SH, wherein R represents an organic hydrocarbon radical of 1 to 30 carbon atoms, the proportion of said mercapto compound being from about 10 to about 200 mg per 100 mg of said polypeptide, the concentration of said polypeptide being from about 0.01 to about 0.5 mg of polypeptide per ml of solution, the pH of said solution being maintained from about 4.5 to about 9.0, and the ambient temperature being maintained from about 0° to about 25° C.

4. A method according to claim 3 wherein the proportion of said mercapto compound is about 50 mg per 100 mg of said polypeptide, the concentration of said polypeptide is about 0.25 mg of polypeptide per ml of solution, and the pH is maintained from about 8.0 to about 8.4.

5. A method according to claim 4 wherein said mercapto compound is dithiothreitol, mercaptoethanol or cysteine.

6. A method according to claim 2 which includes the further step, subsequent to said step (c), of reacting said polypeptide with 2-hydroxy-5-nitrobenzyl bromide to form a derivative having 2-hydroxy-5-nitrobenzyl substituted on the tryptophan residue of said polypeptide.

7. A method according to claim 2 which includes the further step, subsequent to said step (c), of reacting said polypeptide with 2-nitrophenylsulfenyl chloride to form a derivative having 2-nitrophenylsulfenyl substituted on the tryptophan residue of said polypeptide.

8. A method according to claim 2 which includes the further steps, subsequent to said step (c), of reducing said disulfide bridges to sulfhydryl groups on the cysteine residues of said polypeptide and reacting said reduced polypeptide with iodoacetamide to form a derivative having tetra-S-carbamidomethyl substituted on said cysteine residues.

9. A compound which comprises synthetic, biologically-active human growth - promoting substance having the structure shown in the accompanying drawing.

10. A compound according to claim 9 which has growth-promoting activity when assayed by the rat tibia test.

11. A compound according to claim 9 which has lactogenic activity when assayed by the pigeon crop-sac test.

12. A compound according to claim 9 which reacts immunologically with rabbit antiserum to human growth hormone when assayed by the agar diffusion test.

13. A compound according to claim 9 which is substituted with 2-hydroxy-5-nitrobenzyl group on the tryptophan residue thereof.

14. A compound according to claim 9 which is substituted with 2-nitrophenylsulfenyl on the tryptophan residue thereof.

15. A compound according to claim 9 without the disulfide bridges shown in the drawing and substituted instead with tetra-S-carbamidomethyl groups on the cysteine residues thereof.

16. A compound produced in accordance with the method of claim 1.

17. A compound produced in accordance with the method of claim 2.

18. A compound produced in accordance with the method of claim 6.

19. A compound produced in accordance with the method of claim 7.

20. A compound produced in accordance with the method of claim 8.

* * * * *